(12) United States Patent
Brdiczka

(10) Patent No.: US 9,390,455 B2
(45) Date of Patent: Jul. 12, 2016

(54) METHOD AND SYSTEM FOR CALCULATING IMPORTANCE OF COMMUNICATION PARTICIPANTS

(75) Inventor: Oliver Brdiczka, Mountain View, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 1107 days.

(21) Appl. No.: 13/459,875

(22) Filed: Apr. 30, 2012

(65) Prior Publication Data

US 2013/0289939 A1    Oct. 31, 2013

(51) Int. Cl.
| | |
|---|---|
| *G06F 15/16* | (2006.01) |
| *G06Q 50/00* | (2012.01) |
| *H04L 12/58* | (2006.01) |
| *G06Q 10/10* | (2012.01) |
| *G06Q 99/00* | (2006.01) |
| *G06F 7/00* | (2006.01) |
| *H04L 29/08* | (2006.01) |
| *H04L 29/12* | (2006.01) |
| *G06F 17/30* | (2006.01) |

(52) U.S. Cl.
CPC ............. *G06Q 50/01* (2013.01); *G06Q 10/107* (2013.01); *H04L 51/16* (2013.01); *H04L 51/26* (2013.01); *G06F 17/3053* (2013.01); *H04L 51/32* (2013.01); *H04L 51/38* (2013.01); *H04L 61/1594* (2013.01); *H04L 67/22* (2013.01)

(58) Field of Classification Search
CPC ...... G06Q 10/107; G06Q 50/01; H04L 51/18; H04L 51/26; H04L 51/16; H04L 51/38; H04L 51/32; H04L 61/1594; G06F 17/3053
USPC .......... 709/202, 203, 206, 224; 707/732, 748; 705/319; 455/405
See application file for complete search history.

(56) References Cited

U.S. PATENT DOCUMENTS

| | | | | |
|---|---|---|---|---|
| 7,343,365 | B2 * | 3/2008 | Farnham et al. | 715/853 |
| 8,943,053 | B2 * | 1/2015 | Kristiansson et al. | 707/732 |
| 2012/0324001 | A1 * | 12/2012 | Leacock et al. | 709/204 |

* cited by examiner

*Primary Examiner* — Jungwon Chang
(74) *Attorney, Agent, or Firm* — Shun Yao; Park, Vaughan, Fleming & Dowler LLP

(57) ABSTRACT

One embodiment of the present invention provides a system for evaluating contact priority for a user. During operation, the system collects statistical information associated with interactions between the user and the user's contacts across multiple communication channels, and evaluates the contact priority for a contact based at least on the collected statistical information.

21 Claims, 5 Drawing Sheets

METHOD AND SYSTEM FOR CALCULATING IMPORTANCE OF COMMUNICATION PARTICIPANTS

BACKGROUND

1. Field

This disclosure is generally related to determination of people prominence. More specifically, this disclosure is related to a method for deriving a user's perceived importance of communication partners across multiple communication channels, social networks, and contexts.

2. Related Art

The ubiquity of emails and the rapid development of social networks have greatly expanded an individual's realm of communications. A person may find himself, on a daily basis, being bombarded with tens, even hundreds of communication messages, including emails, instant messages, Facebook™ posts, Twitter™ tweets, phone calls, text messages, etc. Sifting through such a large number of messages for something relevant presents a challenge to the person.

Many approaches have been adopted to help a user tackle this "information overload." For example, various email management schemes have been incorporated into commercially available email systems, such as Microsoft Outlook™ (trademark of Microsoft Corporation of Redmond, Wash.) or Eudora® (registered trademark of Qualcomm Inc. of San Diego, Calif.). For example, a sender of an email can flag an email as important, and a recipient of emails can filter the received emails into different folders based on various criteria, such as the sender of the email. Moreover, some social network sites, such as Facebook, prioritize a user's list of friends base on streams of communication between the user and his friends within that social network. However, these schemes only apply to a single communication channel, neglecting the fact that a user often interacts with people over multiple communication channels.

SUMMARY

One embodiment of the present invention provides a system for evaluating contact priority for a user. During operation, the system collects statistical information associated with interactions between the user and the user's contacts across multiple communication channels, and evaluates the contact priority for a contact based at least on the collected statistical information.

In a variation on this embodiment, the system further obtains cloud transitivity associated with the contact.

In a further variation, evaluating the contact priority for the contact further involves calculating a priority factor based on the cloud transitivity associated with the contact.

In a variation on this embodiment, the multiple communication channels include: face-to-face communications, offline communication channels, and online communication channels.

In a variation on this embodiment, the statistical information associated with the interactions between the user and the user's contacts includes frequencies and/or durations of the interactions.

In a further variation, evaluating the contact priority for the contact involves ranking the contact among the user's contacts based on the frequencies and/or the durations of the interactions.

In a variation on this embodiment, the contact priority has a binary value.

In a variation on this embodiment, the contact priority has a numerical value ranging between 0 and 1.

BRIEF DESCRIPTION OF THE FIGURES

In the figures, like reference numerals refer to the same figure elements.

DETAILED DESCRIPTION

Figure 1:
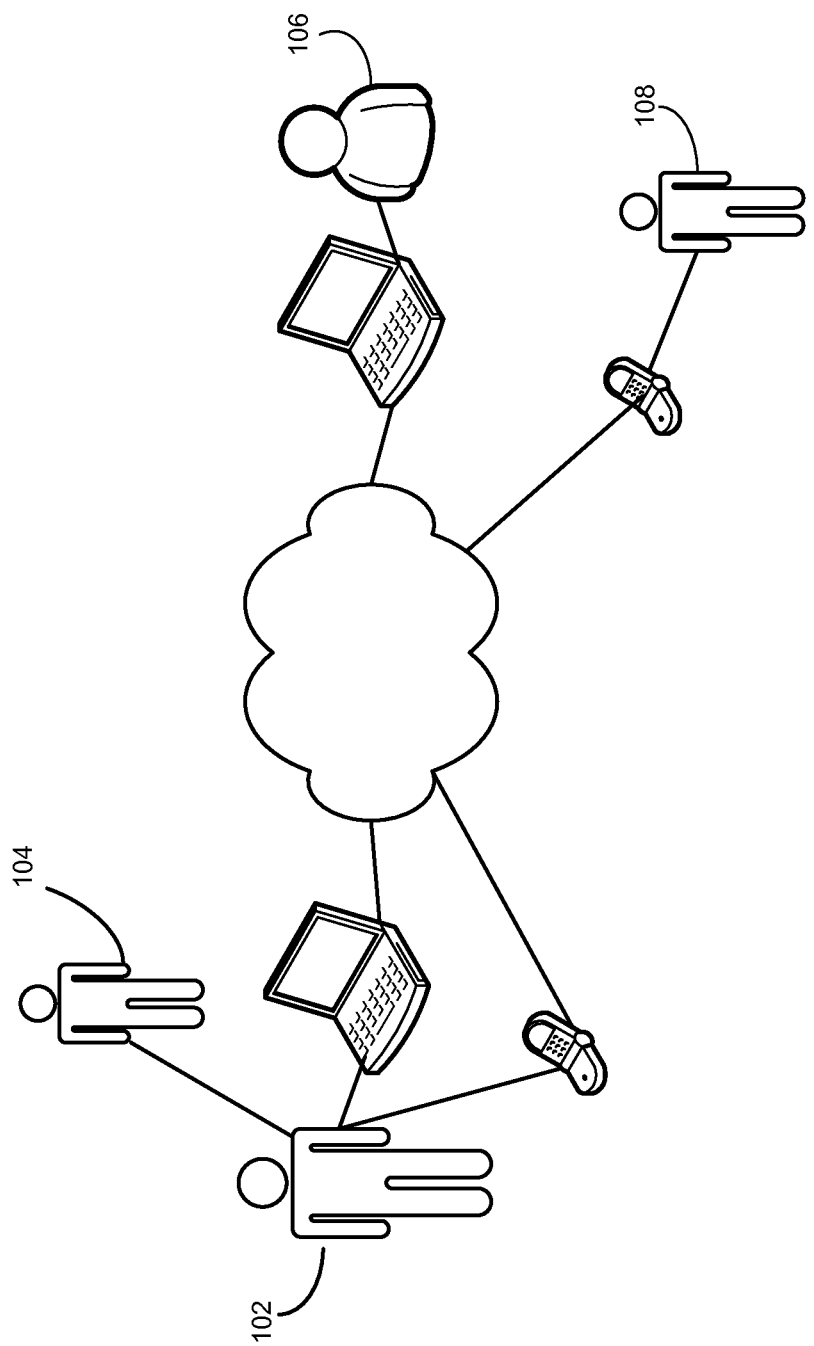
FIG. 1 presents a diagram illustrating the various channels over which a user interacts with his contact, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a method and a system for deriving a user's perceived priority of communication partners across multiple communication channels. The system calculates a person's priority in relation to the user based on a number of factors, including the amount of time the person spent with the user, the amount and frequency of online/offline communications between the person and the user, and the number of other "important" persons who have also perceived this person as important.

Unified Contact Priority

In order to assist a user in dealing with the information overload, many different approaches have been developed to differentiate among the large number of communication messages received by the user. Some email prioritizing techniques either rely on a priority flag set by the email sender or use a complex model to derive message importance.

One approach to differentiate among the messages is based on the importance of the originator or sender of the message. For example, if it is determined that a particular email received by a user is sent by his mother, who is of significant importance to the user, then this particular email can be determined to be important. Hence, it is important to have a system capable of deriving people priority.

Existing social networks have provided solutions to rank a user's contacts/friends by their priority for the user. However, these existing contact-priority-ranking solutions calculate the priority of a contact/friend only based on communication streams or connections between the contact/friend and the user within the realm of a particular social networking site, without integrating with other types of communication streams (such as emails or posts on a different social networking site), real-world communications (such as phone calls), and physical contexts. Hence, these contact-priority-ranking solutions can be flawed. For example, a user's mother, although being an important person in a user's life, may very rarely visit the user's social networking page, thus being ranked as a person of less importance to the user based on a contact-priority-ranking algorithm run by the social network site. Such an algorithm may cause the user to ignore a message posted by his mother on his social networking page.

In embodiments of the present invention, when deriving a contact's priority as perceived by the user, a number of factors associated with different modalities are considered, including the time spent together, multiple online/offline communication streams, and the cloud transitivity. In other words, all aspects of interaction between the user and his contacts are considered.

FIG. 1 presents a diagram illustrating the various channels over which a user interacts with his contact, in accordance with an embodiment of the present invention. In FIG. 1, a user 102 interacts with a number of his contact persons, such as contacts 104, 106, and 108. The interaction between user 102 and contact 104 is a direct physical interaction, such as a face-to-face meeting. User 102 interacts with contact 106 over various online communication channels, including, but not limited to: emails, instant messages, and various social network sites. In addition, user 102 interacts with user 108 using a real-world communication channel, such as mobile phones or fixed phones. Note that although FIG. 1 illustrates user 102 interacting with each contact over a different communication channel, in practice, user 102 often interacts with a contact over multiple communication channels, and a particular communication channel can also be used by user 102 to interact with multiple contacts. For example, in addition to face-to-face meetings, user 102 can also interact with contact 104 via online communications or phone calls. Similarly, in addition to having phone conversations with contact 108, user 102 can also communicate with contacts 104 and 106 over the phone.

Figure 2:
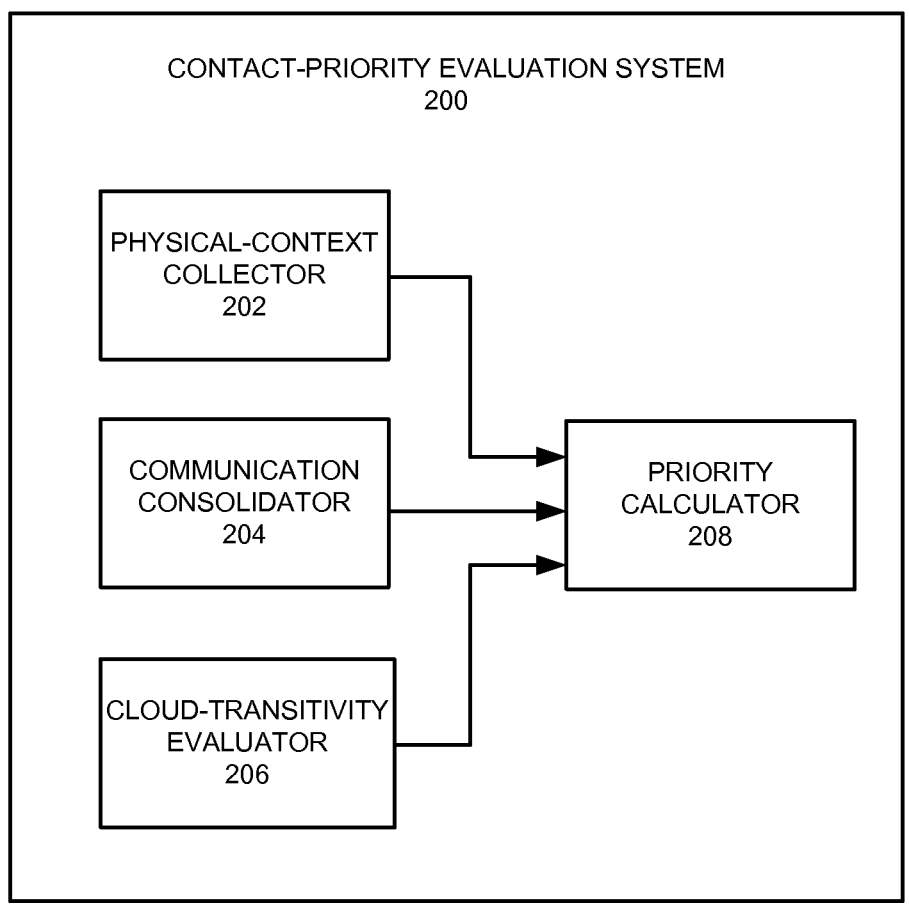
FIG. 2 presents a diagram illustrating a contact-priority evaluation system, in accordance with an embodiment of the present invention.

FIG. 2 presents a diagram illustrating a contact-priority evaluation system, in accordance with an embodiment of the present invention. Contact-priority evaluation system 200 includes a physical-context collector 202, a communication consolidator 204, a cloud-transitivity evaluator 206, and a priority calculator 208.

Physical-context collector 202 collects physical context associated with the user and his contacts. Note that the physical context includes information associated with direct physical interactions between the user and his contact person. For example, the user and his contact person may have a scheduled face-to-face meeting, or they may have a casual, unscheduled chat. In addition, being in the vicinity of each other, such as attending an activity (such as a conference or a party) together, although without direct verbal interaction, may also signal importance. Various techniques can be used to collect physical context. For example, physical-context collector 202 can access the user's electronic calendar (or calendars if the user maintains multiple calendars) in order to collect information associated with scheduled meetings. In addition, physical-context collector 202 can also interact with certain people-sensing systems that sense proximity of other people associated with the user. For example, a user's mobile phone may be configured to detect the presence of other mobile phones, which correspond to the presence of other people.

Communication consolidator 204 monitors and consolidates the user's online and offline communication with his contacts. Forms of online communication include, but are not limited to: email, instant messaging (IM), interactions (such as posts or comments) on social networking websites, web conferencing, etc. Forms of offline communications include, but not limited to: telephone calls (which involve either a landline telephone or a mobile phone) and Short Message Service (SMS) text messaging.

Cloud-transitivity evaluator 206 interacts with contact-priority evaluation systems associated with other users in order to extract the cloud-transitivity for a particular contact. Note that the cloud-transitivity of a particular contact is defined as the number of "important" contacts that perceive this particular contact as "important."

The outputs of physical-context collector 202, communication consolidator 204, and cloud-transitivity evaluator 206 are sent to priority calculator 208, which calculates a unified contact priority based on the physical context and those aforementioned multiple communication channels.

In one embodiment, the contact priority is a binary variable with "1" indicating a contact being "important" and "0" indicating otherwise. In a further embodiment, the binary contact priority for a contact "P" can be formulated as:

$$\text{Priority } (P) = T(P) \text{ AND } F(P) \text{ AND } O(P) \text{ AND } C(P), \quad (1)$$

where $T(P)$ is a binary variable that measures the time priority, $F(P)$ a binary variable that measures the offline-communication priority, $O(P)$ a binary variable that measures online-communication priority, and $C(P)$ a binary variable that measures cloud-transitivity priority. Note that the AND log operations ensure that a contact will be perceived as important only if all four priority measures return "true."

More specifically, time priority $T(P)$ can be calculated as:

$$T(P) = ((f_1(P)/N < \theta_1) \text{ AND } (f_2(P)/N < \theta_2)) \text{ OR } ((f_3(P)/N < \theta_3) \text{ AND } (f_4(P)/N < \theta_4)). \quad (2)$$

Offline-communication priority $F(P)$ can be calculated as:

$$F(P) = (f_5(P)/N < \theta_5) \text{ AND } (f_6(P)/N < \theta_6). \quad (3)$$

Online-communication priority $O(P)$ can be calculated as:

$$O(P) = S_1(P) \text{ OR } S_2(P) \ldots \text{ OR } S_i(P) \ldots \text{ OR } S_n(P),$$

$$S_i(P) = (f_7(P)/N < \theta_7) \text{ AND } (f_8(P)/N < \theta_7) \text{ AND } (f_9(P)/N < \theta_7)$$

where AND $(f_{10}(P)/N < \theta_7)$ AND $(f_{11}(P)/N < \theta_7)$.

$$\text{AND } (f_{12}(P)/N < \theta_7) \text{ AND } (f_{13}(P)/N < \theta_{time}) \quad (4)$$

Cloud-transitivity priority $C(P)$ can be calculated as:

$$C(P) = f_{14}(P)/N_{imp} > \theta_8. \quad (5)$$

In Eqs. (2)-(5) N is the number of user contacts, $N_{imp}$ is the number of important user contacts, $f_1(P)$ through $f_{14}(P)$ are various ranking variables that describe how contact P ranks among all user contacts over different categories (such as time spent together with the user), and $\theta_1$-$\theta_8$ and $\theta_{time}$ are the different threshold values to be set for the variables such that they determine what rank (in term of percentage) qualifies as being important for each category.

The different ranking variables are explained in detail below. $f_1(P)$ ranks contact P based on the amount of time the user spent for scheduled meetings that include contact P; $f_2(P)$ ranks contact P based on the occurrence frequency of the user's scheduled meetings that include contact P; $f_3(P)$ ranks contact P based on the amount of time the user spent in the vicinity of contact P; $f_4(P)$ ranks contact P based on the occurrence frequency of the user being in the vicinity of contact P; $f_5(P)$ ranks contact P based on the amount of time the user spent on offline/telephone communications with contact P; $f_6(P)$ ranks contact P based on the occurrence frequency of the offline/telephone communications between the user and contact P; $f_7(P)$ ranks contact P based on the number of all unfiltered online conversations/interactions that include both the user and contact P; $f_8(P)$ ranks contact P based on the number of online conversations/interactions that are contributed by the user and include contact P; $f_9(P)$ ranks contact P based on the number of emails sent from the user to contact P; $f_{10}(P)$ ranks contact P based on the number of reply emails (emails sent as replies to previous emails) sent from the user to contact P; $f_{11}(P)$ ranks contact P based on the number of emails sent from contact P to the user; $f_{12}(P)$ ranks contact P based on the number of reply emails sent from contact P to the user; $f_{13}(P)$ ranks contact P based on the number of days since the last email has been received from or sent to contact P by the user; and $f_{14}(P)$ ranks contact P based on the number of the user's important contacts (contacts who have been flagged by the user as important) who have also flagged contact P as important.

Note that, in Eq. (4), each S(P) calculates an online-communication priority function for a particular time interval. Hence, the corresponding ranking variables ($f_7(P)$ through $f_{13}(P)$) for a particular S(P) are determined for that particular time interval. Also note that these priority functions may or may not overlap in time. Calculating a priority function for different time intervals is important because a user's online communications with a particular contact may be bursty in nature. For example, a temporary project may result in the user interacting with someone intensively over a brief time interval. Such bursts may be ignored if these communications are averaged over a long period.

The various thresholds ($\theta_1$-$\theta_8$ and $\theta_{time}$) can either be set manually by the user or be set to a default value by the system. In one embodiment, $\theta_1$-$\theta_8$ are set to the same percentage value (such as 10%). In one embodiment, $\theta_1$-$\theta_8$ are set to different percentage values.

In addition to using Eqs. (1)-(5) to derive contact priorities, in one embodiment, the system also allows a user to manually set contact priorities. For example, the user can go through his contact list and manually flag a contact as important.

In one embodiment, instead of being a binary variable, contact priorities can also be expressed by numeric values, where a larger number indicates a higher priority. In one embodiment, the numeric contact priority can be calculated as:

$$\text{Priority}^*(P) = \text{MAX}[\alpha_1 \cdot {}^*(P), \alpha_2 \cdot F^*(P), \alpha_3 \quad O^*(P), \alpha_4 \cdot C^*(P)], \quad (6)$$

where Priority*(P) is the numeric overall contact priority, T*(P) the numeric time priority, F*(P) the numeric offline-communication priority, O*(P) the numeric online-communication priority, C*(P) the numeric cloud-transitivity priority, and $\alpha_1$ through $\alpha_4$ are weight variables defining the influence of each priority value on the overall priority value.

The various numeric priorities, T*(P), F*(P), O*(P), and C*(P), can be calculated separately as:

$$T^*(P) = \text{MAX}\{\text{MIN}[\alpha_5 \cdot (1-f_1(P)/N, \alpha_6 \cdot (1-f_2(P)/N], \\ \text{MIN}[\alpha_7 \cdot (1-f_3(P)/N, \alpha_8 \cdot (1-f_4(P)/N]\} \quad (7)$$

$$F^*(P) = \text{MIN}[\alpha_9 \cdot (1-f_5(P)/N, \alpha_{10} \cdot (1-f_6(P)/N]; \quad (8)$$

$$O^*(P) = \text{MAX}[o_1 \cdot S^*_1(P), \ldots o_j \cdot S^*_j(P), \ldots o_n \cdot S^*_n(P)],$$

$$S^*_j(P) = \text{MIN}[\beta_{j1} \cdot f_7(P)/N, \beta_{j2} \cdot f_8(P)/N, \beta_{j3} \cdot f_9(P)/N, \\ \beta_{j4} \cdot f_{10}(P)/N, \text{where } \beta_{j5} \cdot f_{11}(P)/N, \beta_{j6} \cdot f_{12}(P)/N] \\ *\text{MAX}[(1-f_{13}(P)/\theta_{time}), 0.0] \quad (9)$$

and $$C^*(P) = f_{14}(P)/N_{imp}. \quad (10)$$

Note that Eqs. (7)-(10) and Eqs. (2)-(5) share a number of common variables, such as N, $N_{imp}$, ranking variables $f_1(P)$ through $f_{13}(P)$, $f_{14}(P)$, and time threshold $\theta_{time}$. In addition, Eqs. (7)-(10) include a number of weight variables, such as $\alpha_1, \ldots, \alpha_{10}, o_1, \ldots, o_n, \beta_{11}, \ldots, \beta_{n6}$, having values between 0 and 1. These weight variables can be used to define the influence of each factor and sub-factor to the overall priority value. In one embodiment, the system allows the user to manually set these weight variables. For example, a user may consider his online activities more important, hence setting $\alpha_3$ at a higher value, such as 1.

Note that the aforementioned priority-evaluation equations (Eqs. (1)-(10)) are merely exemplary and should not limit the scope of this disclosure. In general, embodiments of the present invention provide a method that calculates a unified contact priority across multiple communication channels. The exact expression of the contact priority can be different from Eqs. (1)-(10). For example, instead of calculating a contact priority by ranking the contact among all user contacts, the system may calculate a contact priority using the volume of the communications (such as number of emails).

Figure 3:
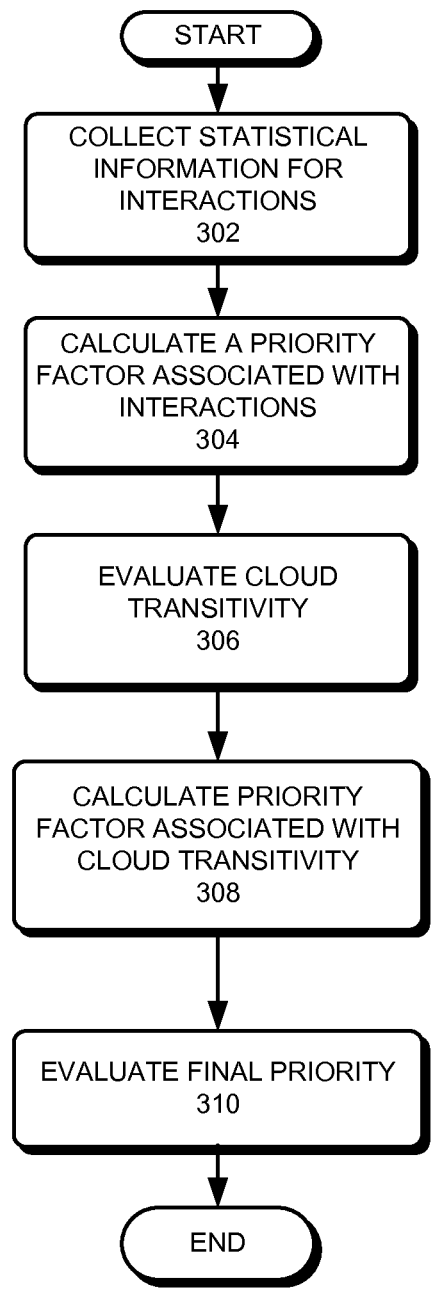
FIG. 3 presents a flow chart illustrating the process of evaluating a contact's priority, in accordance with an embodiment of the present invention.

FIG. 3 presents a flow chart illustrating the process of evaluating a contact's priority, in accordance with an embodiment of the present invention. During operation, the priority-evaluation system collects statistical information associated with interactions between the user and the user's contacts (operation 302). In one embodiment, the interactions between the user and his contacts include, but are not limited to: direct physical interactions, offline (telephone) communications, and online communications. Subsequently, for each user contact, the system calculates a priority factor associated with the user-user contact interactions (operation 304). In one embodiment, the system calculates a priority sub-factor for each type of user-user contact interaction. For example, the system may calculate a priority sub-factor based on direct physical interaction between the user and his contact. The system further evaluates the cloud transitivity corresponding to each user contact (operation 306), and calculates a priority factor associated with the cloud transitivity (operation 308). In one embodiment, the system interacts with priority-evaluation systems belonging to other users in order to obtain cloud transitivity. The system then determines the final priority for a contact based on the priority factor associated with the user-user contact interactions and the priority factor associated with the cloud transitivity (operation 310). In one embodiment, the final contact priority is expressed as a binary value (important or unimportant). In one more embodiment, the final contact priority is expressed by a numerical value between 1 and 0.

User Interface and Computer System

Figure 4:
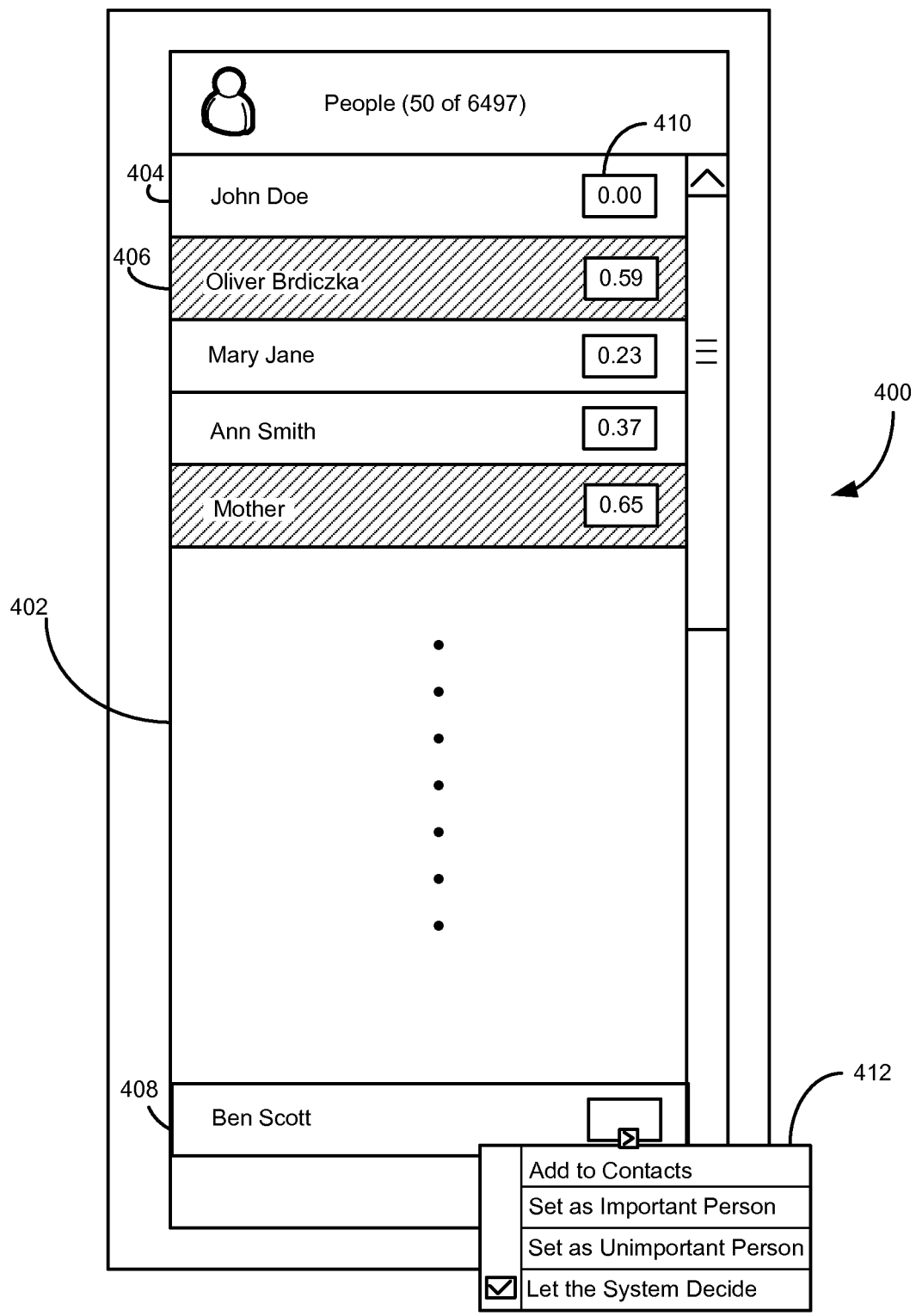
FIG. 4 presents a diagram illustrating an exemplary graphical user interface (GUI), in accordance with an embodiment of the present invention.

FIG. 4 presents a diagram illustrating an exemplary graphical user interface (GUI), in accordance with an embodiment of the present invention. GUI 400 includes a contact field 402. Contact field 402 includes a number of entries, such as entries 404, 406, and 408, with each entry corresponding to a particular contact. For example, entry 404 corresponds to a user contact named "John Doe." In addition to the contact name, each entry also includes a priority field. For example, entry 404 includes a priority field 410. The priority field indicates the priority value of the corresponding contact. In the example shown in FIG. 4, the priority field includes a numeric number ranging between 0 and 1, with a larger number corresponding to a higher priority. In one embodiment, the system highlights contact entries having a priority value higher than a threshold, thus making it easier for the user to identify important contacts. In the example shown in FIG. 4, any contacts with priority value higher than 0.5 are highlighted.

In one embodiment, the system allows the user to manually enter a contact priority value. For example, when the user attempts to set the priority for contact "Ben Scott," the user can either directly fill in a number in the priority field or select an entry from a drop-down menu 412. In the example shown in FIG. 4, by selecting the entry "Let the System Decide," the user delegates the system to calculate a priority value for the contact. Other entries included in drop-down menu 412 allow the user to manually set the contact as "important" or "unimportant."

Figure 5:
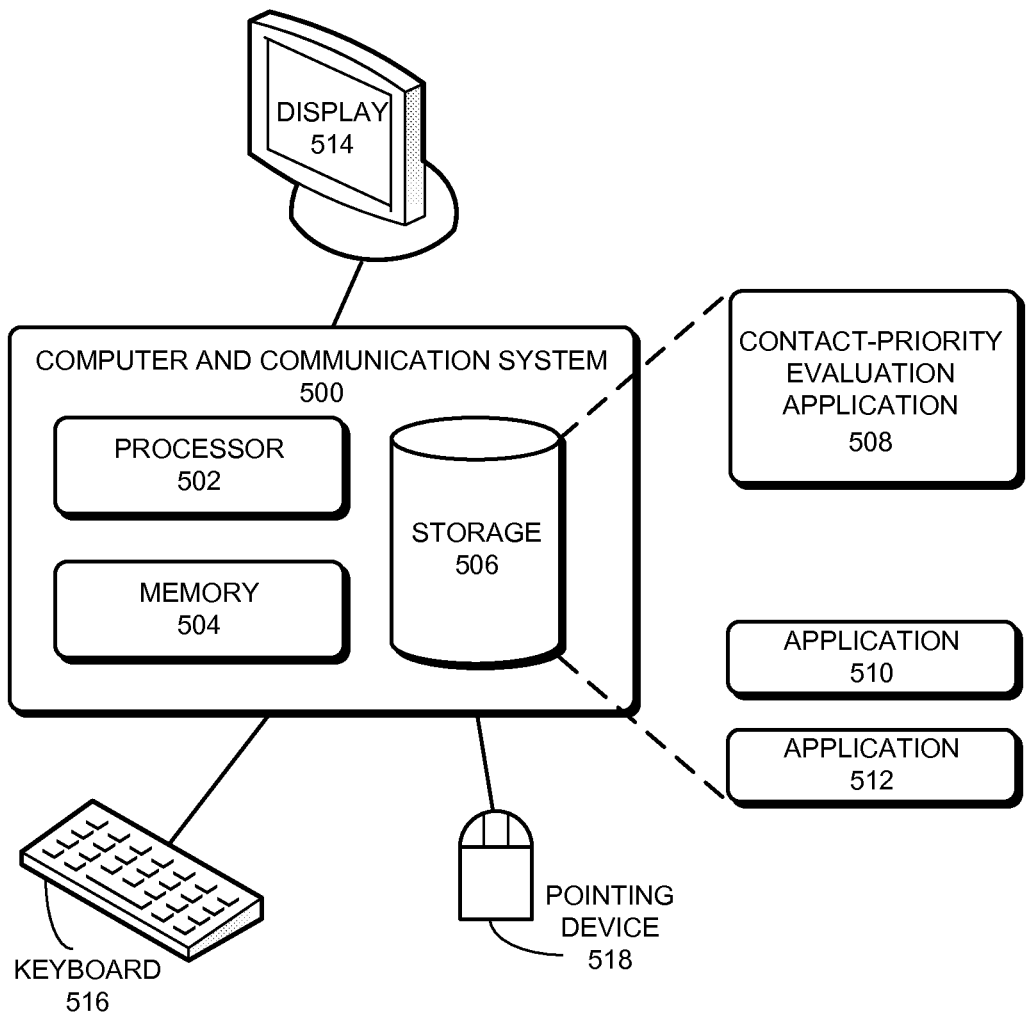
FIG. 5 illustrates an exemplary computer system for evaluating a contact's priority, in accordance with one embodiment of the present invention.

FIG. 5 illustrates an exemplary computer system for evaluating a contact's priority in accordance with one embodiment of the present invention. In one embodiment, a computer and communication system 500 includes a processor 502, a memory 504, and a storage device 506. Storage device 506 stores a contact-priority evaluation application 508, as well as other applications, such as applications 510 and 512. During operation, contact-priority evaluation application 508 is loaded from storage device 506 into memory 504 and then executed by processor 502. While executing the program, processor 502 performs the aforementioned functions. Computer and communication system 500 is coupled to an optional display 514, keyboard 516, and pointing device 518.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for evaluating contact priority for a user, the method comprising:
    collecting, by a first computer, statistical information associated with interactions between the user and the user's contacts across multiple communication channels, wherein the statistical information includes the user's communications and a duration of physical proximity detected between the user and a first contact, by mobile computing devices associated with the user and the first contact;
    computing a first contact priority value for the first contact based at least on the collected statistical information;
    receiving, by the first computer via a computer network, from a client computer associated with a high-priority second contact of the user, a second contact priority value specifying whether the second contact perceives the first contact as high-priority;
    computing a cloud transitivity for the first contact based on the second contact priority value, wherein the cloud transitivity for the first contact specifies a number of high-priority contacts who perceive the first contact as high-priority;
    computing an overall priority for the first contact based at least on the first contact priority value and the cloud transitivity for the first contact; and
    presenting to the user, by the first computer on a display of the first computer:
        a contact list comprising a plurality of the user's contacts ranked by contact priority values, including the overall priority computed for the first contact; and
        in response to receiving a message from a high-priority contact, a notification that the received message is high-priority.

2. The method of claim 1, wherein computing the cloud transitivity for the first contact comprises receiving additional contact priority values for the first contact from one or more remote contact priority evaluation systems associated with other users.

3. The method of claim 1, wherein the multiple communication channels include:
    face-to-face communications;
    offline communication channels; and
    online communication channels.

4. The method of claim 1, wherein the statistical information associated with the interactions between the user and the user's contacts includes frequencies and/or durations of the interactions.

5. The method of claim 4, wherein computing the first contact priority value for the first contact involves ranking the first contact among the user's contacts based on the frequencies and/or the durations of the interactions.

6. The method of claim 1, wherein the first contact priority value has a binary value.

7. The method of claim 1, wherein the first contact priority value has a numerical value ranging between 0 and 1.

8. A non-transitory computer-readable storage medium storing instructions that when executed by a computer cause the computer to perform a method for evaluating contact priority for a user, the method comprising:
    collecting statistical information associated with interactions between the user and the user's contacts across multiple communication channels, wherein the statistical information includes the user's communications and a duration of physical proximity detected between the user and a first contact by mobile computing devices associated with the user and the first contact;
    computing a first contact priority value for the first contact based at least on the collected statistical information;
    receiving, by the first computer via a computer network, from a client computer associated with a high-priority second contact of the user, a second contact priority value specifying whether the second contact perceives the first contact as high-priority;

computing a cloud transitivity for the first contact based on the second contact priority value, wherein the cloud transitivity for the first contact specifies a number of high-priority contacts who perceive the first contact as high-priority;

computing an overall priority for the first contact based at least on the first contact priority value and the cloud transitivity for the first contact; and presenting to the user, by the first computer on a display of the first computer:
- a contact list comprising a plurality of the user's contacts ranked by contact priority values, including the overall priority computed for the first contact; and
- in response to receiving a message from a high-priority contact, a notification that the received message is high-priority.

9. The non-transitory computer-readable storage medium of claim 8, wherein computing the cloud transitivity for the first contact comprises receiving additional contact priority values for the first contact from one or more remote contact priority evaluation systems associated with other users.

10. The non-transitory computer-readable storage medium of claim 8, wherein the multiple communication channels include:
- face-to-face communications;
- offline communication channels; and
- online communication channels.

11. The non-transitory computer-readable storage medium of claim 8, wherein the statistical information associated with the interactions between the user and the user's contacts includes frequencies and/or durations of the interactions.

12. The non-transitory computer-readable storage medium of claim 11, wherein computing the first contact priority value for the first contact involves ranking the first contact among the user's contacts based on the frequencies and/or the durations of the interactions.

13. The non-transitory computer-readable storage medium of claim 8, wherein the first contact priority value has a binary value.

14. The non-transitory computer-readable storage medium of claim 8, wherein the first contact priority value has a numerical value ranging between 0 and 1.

15. A computing system for evaluating contact priority for a user, the system comprising:
- a processor;
- a collecting mechanism configured to collect statistical information associated with interactions between the user and the user's contacts across multiple communication channels, wherein the statistical information includes the user's communications and a duration of physical proximity detected between the user and a first contact by mobile computing devices associated with the user and the first contact;
- a priority-evaluation mechanism configured to compute a first contact priority value for the first contact based at least on the collected statistical information;
- a priority-value receiving mechanism configured to receive, via a computer network, from a client computer associated with a high-priority second contact of the user, a second contact priority value specifying whether the second contact perceives the first contact as high-priority;
- a cloud-transitivity evaluator configured to compute the cloud transitivity for the first contact based on the second contact priority value, wherein the cloud transitivity for the first contact specifies a number of high-priority contacts who perceive the first contact as high-priority; and
- an updating mechanism configured to compute an overall priority for the first contact based at least on the first contact priority value and the cloud transitivity for the first contact; and
- a display configured to present to the user:
  - a contact list comprising a plurality of the user's contacts ranked by contact priority values, including the overall priority computed for the first contact; and
  - in response to the computing system receiving a message from a high-priority contact, a notification that the received message is high-priority.

16. The system of claim 15, wherein the cloud-transitivity evaluator is further configured to:
- receive additional contact priority values for the first contact from one or more remote contact priority evaluation systems associated with other users; and
- compute the cloud transitivity for the first contact based on the additional contact priority values.

17. The system of claim 15, wherein the multiple communication channels include:
- face-to-face communications;
- offline communication channels; and
- online communication channels.

18. The system of claim 15, wherein the statistical information associated with the interactions between the user and the user's contacts includes frequencies and/or durations of the interactions.

19. The system of claim 18, wherein while computing the first contact priority value, the priority-evaluation mechanism is configured to rank the first contact among the user's contacts based on the frequencies and/or the durations of the interactions.

20. The system of claim 15, wherein the first contact priority value has a binary value.

21. The system of claim 15, wherein the first contact priority value has a numerical value ranging between 0 and 1.

* * * * *